US012315242B2

(12) United States Patent
Peng et al.

(10) Patent No.: US 12,315,242 B2
(45) Date of Patent: May 27, 2025

(54) METHOD AND SYSTEM FOR ZERO-SHOT CROSS DOMAIN VIDEO ANOMALY DETECTION

(71) Applicant: Mitsubishi Electric Research Laboratories, Inc., Cambridge, MA (US)

(72) Inventors: Kuan-Chuan Peng, Cambridge, MA (US); Abhishek Aich, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 529 days.

(21) Appl. No.: 17/653,015

(22) Filed: Mar. 1, 2022

(65) Prior Publication Data

US 2023/0281986 A1 Sep. 7, 2023

(51) Int. Cl.
*G06V 10/98* (2022.01)
*G06V 10/82* (2022.01)
*G06V 20/40* (2022.01)

(52) U.S. Cl.
CPC .............. *G06V 10/98* (2022.01); *G06V 10/82* (2022.01); *G06V 20/40* (2022.01)

(58) Field of Classification Search
CPC ......... G06V 10/98; G06V 10/82; G06V 20/40
See application file for complete search history.

(56) References Cited

U.S. PATENT DOCUMENTS

| | | | | |
|---|---|---|---|---|
| 2018/0336435 | A1* | 11/2018 | Takeuchi | G06F 15/76 |
| 2020/0059669 | A1* | 2/2020 | Nishi | H04N 19/503 |
| 2022/0284552 | A1* | 9/2022 | Yang | G06T 5/80 |
| 2022/0292867 | A1* | 9/2022 | Zhang | G06T 7/12 |
| 2023/0055581 | A1* | 2/2023 | Bidstrup | H04N 7/181 |

OTHER PUBLICATIONS

Bang et al. Image augmentation to improve construction resource detection using generative adversarial networks, cut and paste and image transformation techniques. Automation in construction, elsevier, amsterdam, nl vol. 115, Mar. 24, 2020.

* cited by examiner

*Primary Examiner* — Kevin Ky
(74) *Attorney, Agent, or Firm* — Gene Vinokur

(57) ABSTRACT

Embodiments of the present invention disclose a method and system for performing video anomaly detection by training neural networks. The method includes collecting a video of one or more digital images from a source domain. The method includes obtaining a set of images of foreground objects present in the video. In addition, the method includes training of a first neural network to predict frames for the one or more digital images in the video. The first neural network is trained using a future frame prediction module that predicts frames for the one or more digital image. The method includes training of a second neural network to classify the predicted frame as normal and to classify the synthesized pseudo anomaly frame as abnormal. The method includes performing video anomaly detection based on training of the first neural network and the second neural network.

15 Claims, 9 Drawing Sheets

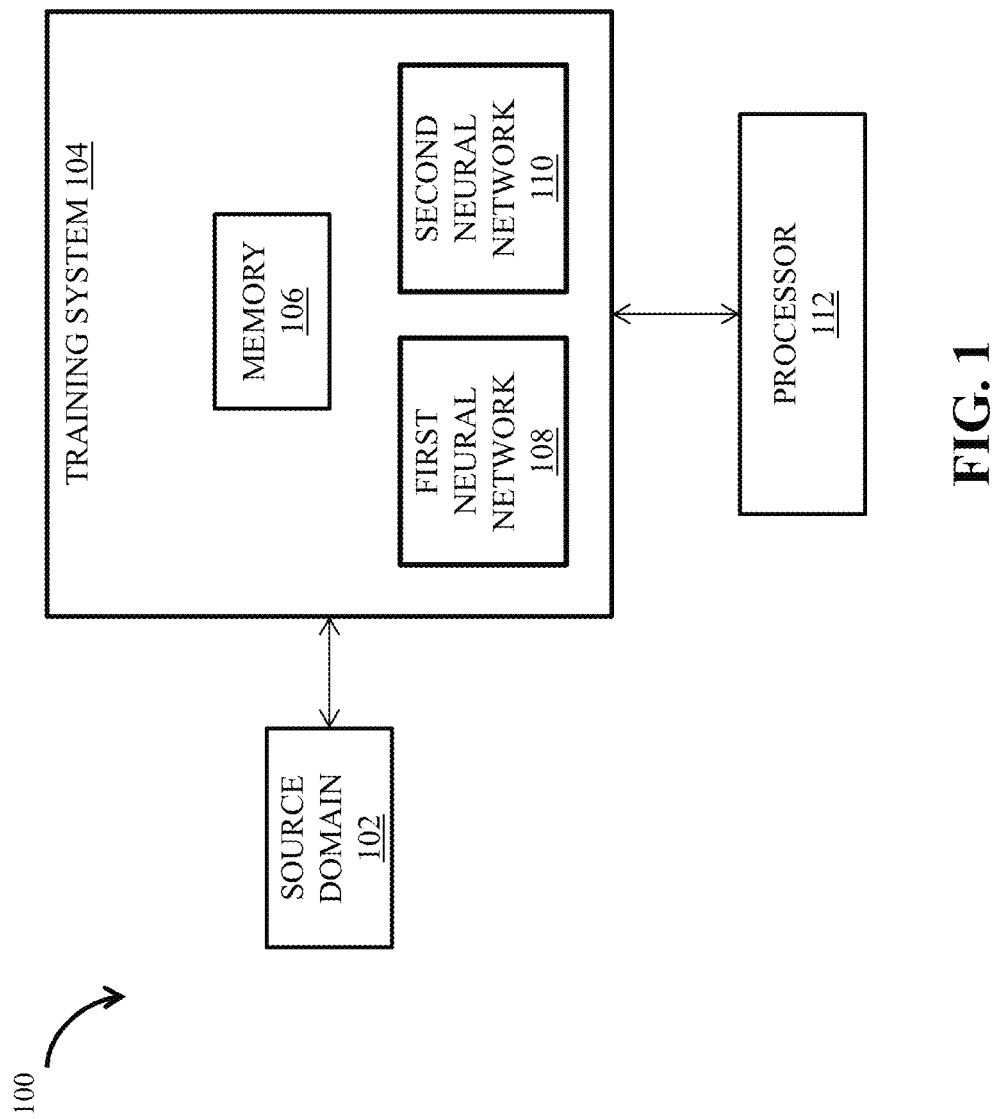

METHOD AND SYSTEM FOR ZERO-SHOT CROSS DOMAIN VIDEO ANOMALY DETECTION

TECHNICAL FIELD

The present disclosure relates to video anomaly detection, and more particularly to method and system for zero-shot cross domain video anomaly detection.

BACKGROUND

Unsupervised Video Anomaly Detection (VAD) is widely used in security and surveillance applications as compared to supervised or weakly-supervised VAD. This is mainly because unsupervised VAD methods do not need training videos containing abnormal events which are rare and laborious to annotate. Hence, with only normal events in training videos, the unsupervised VAD methods mark the inexplicable activities by the trained model as anomalies during testing. Recently, unsupervised VAD methods under cross-domain settings have been introduced. Given the video data containing only normal events from a source domain, the goal is to perform VAD in a different target domain. However, these cross-domain VAD (xVAD) works are few-shot scene adaptation-based methods which need access to both the source and target domain VAD normal data. This assumption becomes a serious problem when there is no access to the required data (videos of normal activities) for model learning, and adaptation. For example, collection or access of video data at public places may not be allowed to third-party corporations due to security and privacy concerns. This renders the current xVAD works ineffective, as these methods are largely dependent on gaining access to at least few target domain training data sets. Existing solutions to the Video Anomaly Detection (VAD) problem requires access to normal training videos acquired from both the source and target domains. As an example of the VAD problem, the source and target domains can be train station and airport scenarios. At training time, only the normal videos (without the abnormal videos) acquired at the train station and airport are available. At testing time, the task is to identify the anomalies in the testing videos acquired at the airport (target domain), and the testing videos include both normal and abnormal videos.

To that end, to address the aforesaid issues, there exists a need for improved xVAD systems and methods that can overcome the above-stated disadvantages.

SUMMARY

The present disclosure provides a method and a system for performing video anomaly detection.

Some embodiments are based on the recognition that zero-shot cross domain video anomaly detection is required without any target domain data.

To that end, some embodiments are based on the realization of a zero-shot cross-domain video anomaly detection (zVAD) system. The zVAD system collects a video of one or more digital images from a source domain. Also, it obtains a set of images of foreground objects present in the video. The video of the source domain corresponds to at least one of a task irrelevant or a task relevant video, video related to normal events, video available publicly, and video of a plurality of images combined together.

Some embodiments are based on the realization that the zVAD system of the present disclosure is configured to perform training of a first neural network to predict frames for the one or more digital images in the video. The first neural network is trained using a future frame prediction module that predicts frames for the one or more digital images. The future frame prediction module comprises a generator and a discriminator. The generator comprises an encoder, a memory module, and a decoder. The future frame prediction module is associated with an object-aware anomaly synthesis module, wherein the object-aware anomaly synthesis module is configured to generate pseudo abnormal frames and learns features from normal frames relative to the pseudo abnormal frames.

Some embodiments are based on the realization that the zVAD system of the present disclosure is configured to perform training of a second neural network. The second neural network is trained to classify the predicted frame for the digital image of the one or more digital images as normal and to classify the predicted frame of the digital image of the one or more digital images having its portion corrupted with an image from the set of images of foreground objects as abnormal. The second neural network is trained using a normalcy classifier module. The normalcy classifier module generates a plurality of loss functions that are utilized to train the second neural network. The plurality of loss functions comprises at least one of: a normalcy loss, a relative normalcy loss, an attention affirmation loss, and a relative attention affirmation loss. The normalcy classifier module utilizes the predicted frames received from the future frame prediction module and the one or more pseudo abnormal frames generated by the object-aware anomaly synthesis module to predict probability of normalities or abnormalities in the video.

Accordingly, some embodiments, disclose a method for performing video anomaly detection by training neural networks. The method includes collecting a video of one or more digital images from a source domain. The method includes obtaining a set of images of foreground objects present in the video. The foreground objects correspond to at least one of a group of people, and an individual person. In addition, the method includes training of a first neural network to predict frames for the one or more digital images in the video. The first neural network is trained using a future frame prediction module that predicts frames for the one or more digital images. Further, the method includes training of a second neural network to classify the predicted frame for the digital image of the one or more digital images as normal and to classify the predicted frame of the digital image of the one or more digital images having its portion corrupted with an image from the set of images of foreground objects as abnormal. The second neural network is trained using a normalcy classifier module. Furthermore, the method includes performing video anomaly detection based on training of the first neural network and the second neural network.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 1 shows a schematic block diagram of a training system for video anomaly detection, according to some embodiments of the present disclosure.

DETAILED DESCRIPTION

Figure 2A:
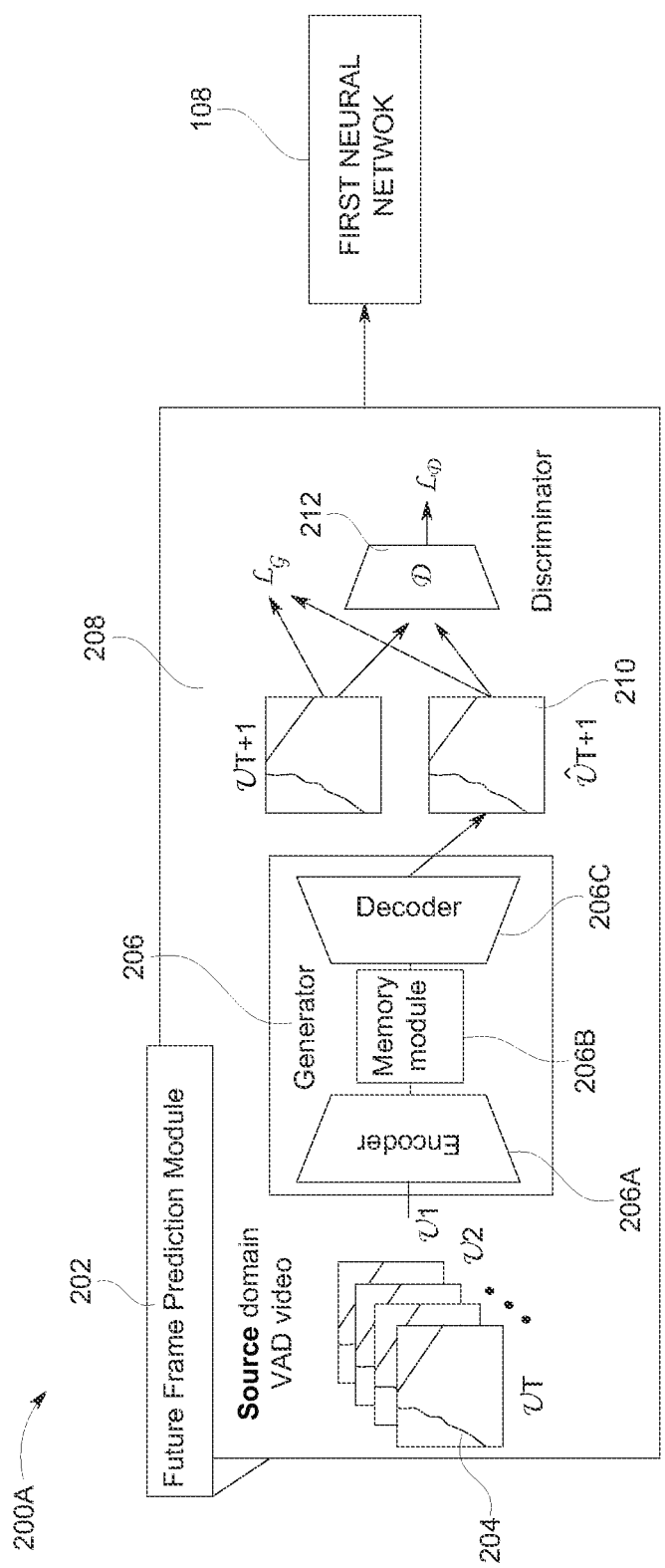
FIG. 2A shows a block diagram of the training system for performing training of the first neural network, according to some embodiments of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

System Overview

FIG. 1 illustrates a schematic block diagram 100 of a training system 104 for video anomaly detection, according to some embodiments of the present disclosure.

The training system 104 includes a memory 106, a first neural network 108, a second neural network 110, and a processor 112. The memory 106 comprises at least one of RAM, ROM, EEPROM, flash memory or other memory technology, CD-ROM, digital versatile disks (DVD) or other optical disk storage, magnetic cassettes, magnetic tape, magnetic disk storage, or any other storage medium which can be used to store the desired information, and which can be accessed by the training system 104. The memory 106 may include non-transitory computer-storage media in the form of volatile and/or nonvolatile memory. The memory 106 may be removable, non-removable, or a combination thereof. Exemplary memory devices include solid-state memory, hard drives, optical-disc drives, and the like. The memory 106 stores instructions which are executed by the processor 112. The execution of the instructions by the processor 112 cause the training system 104 to perform a set of actions explained below.

The training system 104 collects a source domain data such as a video of one or more digital images from the source domain 102 to perform video anomaly detection at a target domain. In an example, the source domain 102 is any place such as an airport, a parking area of a shopping mall, a railway station, and the like. The video of the source domain 102 corresponds to at least one of task irrelevant or relevant video, video related to normal events, video available publicly, and video of a plurality of images combined together. The source domain data includes only the normal events and not abnormal events. For example, a car driving by on the street is regarded as a normal event, but if the car enters a pedestrian area, this is regarded as an abnormal event and a person running on a sports court is regarded as a normal event but a person running outside from a bank is regarded as an abnormal event.

In general, the target domain corresponds to any place at which video anomaly detection is performed. In an example, task corresponds to video anomaly detection. In addition, the training system 104 obtains a set of images of foreground objects present in the video collected from the source domain 102. The foreground objects correspond to at least one of a group of people, and an individual person. The source domain 102 can be different from the target domain. The source domain data is utilized as training data to train the first neural network 108 and the second neural network 110 for performing video anomaly detection.

Further, the first neural network 108 is trained to predict frames for the one or more digital images in the video. Furthermore, the second neural network 110 is trained to classify the predicted frames for the digital image of the one or more digital images as normal or abnormal. For example, the predicted frame of the digital image of the one or more digital images having its portion corrupted with an image from the set of images of foreground objects is classified as abnormal. Moreover, video anomaly detection is performed based on training of the first neural network 108 and the second neural network 110. The anomaly in the video corresponds to but is not limited to fire, fight, collision of two or more objects, and the like. The training of the first neural network 108 and the second neural network 110 is further explained in FIGS. 2A, B, and C.

FIG. 2A illustrates an environment 200A for performing training of the first neural network 108, according to some embodiments of the present disclosure. The zVAD system 104 is associated with a future frame prediction module 202. The first neural network 108 is trained using the future frame prediction module 202 that predicts one or more frames for the one or more digital image.

The future frame prediction module 202 comprises a generator 206 and a discriminator 212. In addition, the first neural network is trained with one or a combination of a reconstruction loss $L_G$ and a discriminative loss $L_D$. The reconstruction loss $L_G$ is computed to train the generator 206. The discriminative loss $L_D$ is computed to train the discriminator 212. The generator 206 collects a video ($v_1$, $v_2$, ..., $v_T$) input frames from a source domain 204 (with normal events). The generator 206 comprises an encoder 206A, a memory module 206B, and a decoder 206C. The encoder 206A takes the video ($v_1$, $v_2$, ..., $v_T$) from the source domain 204 as input and sends encoded output of the video to the memory module 206B. The memory module 206B learns to register prototypical normal features during training. The memory module 206B takes the output from the encoder 206A as input and further provides an output to the decoder 206C. The decoder 206C decodes the output received from the memory module 206B and predicts one or more future frames 210 ($\hat{v}_{T+1}$) that is utilized to train the first neural network 108. The one or more future frames 210 is represented as:

$$G([v_1, v_2, \ldots, v_T]) = \hat{v}_{T+1},$$

where G in G(·) represents the generator 206. The generator is in turn modeled as a memory-augmented generative model G(·), with weights $\theta_G$. The memory module 206B is denoted as the memory module M, and the discriminator 212 is represented as D(·) with weights $\theta_D$.

The one or more predicted future frames 210 ($\hat{v}_{T+1}$) are trained against the discriminator (D) 212 along with generator reconstruction loss $L_G$ and the discriminator loss $L_D$ in a least square GAN setup where the discriminator 212 aims to distinguish between the one or more predicted future frames 210 and one or more ground truth frames $v_{T+1}$ 208.

Figure 2B:
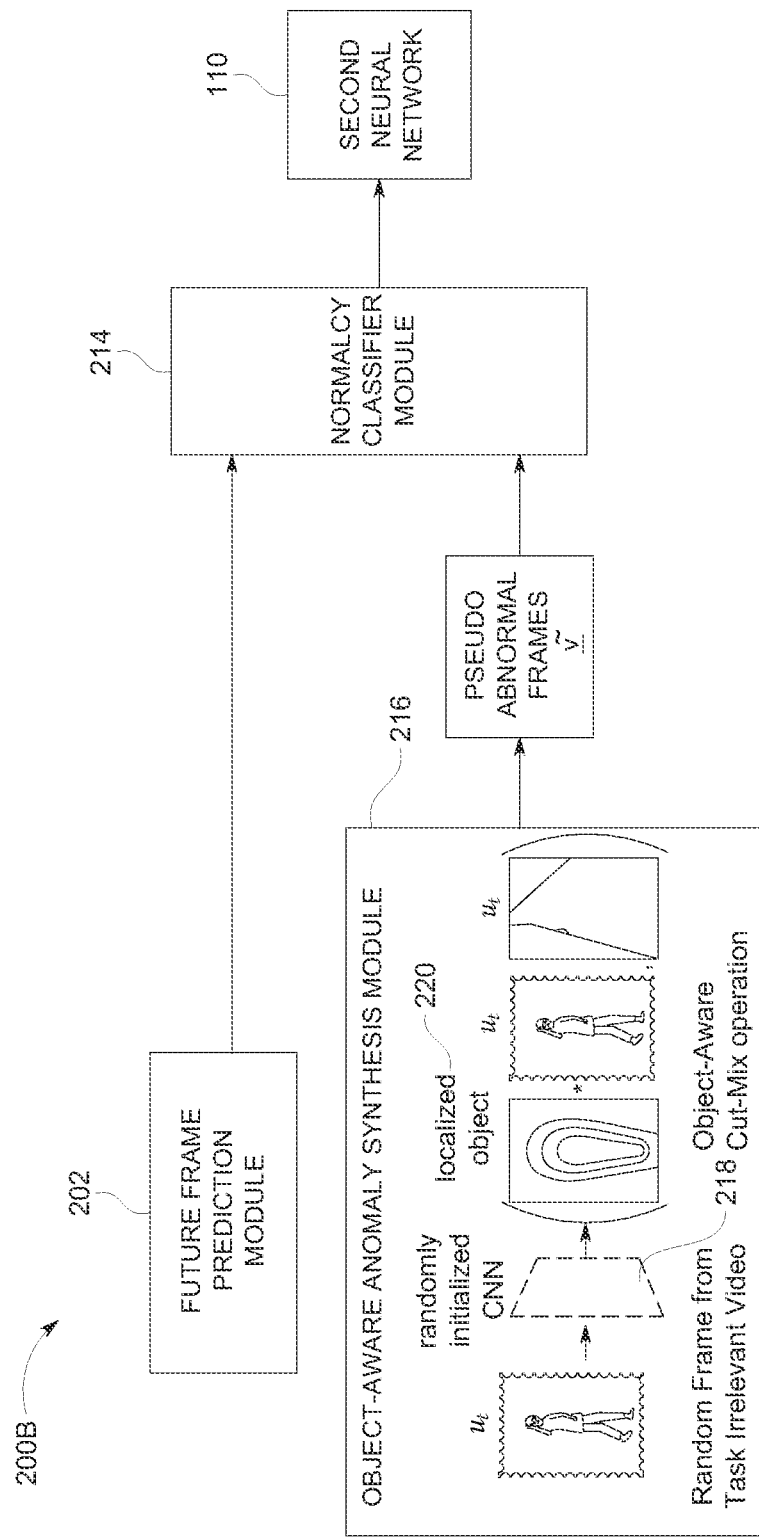
FIG. 2B illustrates a block diagram for training the second neural network, accordingly to some embodiments of the present disclosure.

FIG. 2B illustrates a block diagram 200B for training the second neural network 110, accordingly to some embodiments of the present disclosure. The future frame prediction module 202 is associated with a normalcy classifier module 214. The generator 206 of the future frame prediction module 202 is regularized using the normalcy classifier module 214. The second neural network 110 is trained using the normalcy classifier module 214. In addition, the normalcy classifier module 214 is associated with an object-aware anomaly synthesis module 216. The object-aware anomaly synthesis module 216 takes a random frame $u_t$ from task-irrelevant (TI) datasets as input. In general, task-irrelevant datasets are available by video research community. However, it is difficult to collect different kinds of scenarios of abnormal activities. Hence, TI datasets are introduced for the training system 104 disclosed herein. The TI datasets are freely available from different video downstream or non-VAD tasks such as video classification, action recognition, internet, and the like. Examples of such datasets are UCF101 and Human Motion Database (HMDB). In general, UCF101 is an action recognition data set of realistic action videos, collected from YouTube and other video platforms, having 101 action categories. The UCF101 data set is an extension of UCF50 data set which has 50 action categories. The action categories for UCF101 data set include but are not limited: archery, shooting, biking, bowling, boxing, cricket shot, cutting in kitchen, diving, fencing, and floor gymnastics.

In addition, HMDB is a large collection of realistic videos from various sources, including movies and web videos. The dataset is composed of 6,849 video clips from 51 action categories (such as "jump", "kiss" and "laugh"), with each category containing at least 101 clips. Conclusively, the HMBD dataset is utilized to learn human activities for conducting VAD tasks.

Further, the object-aware anomaly synthesis module 216 includes randomly initialized convolution neural network (randomly initialized CNN) 218. The randomly initialized CNN 218 helps extract objects from input video frames. The objects are obtained on both VAD ($v_t$) and the TI dataset ($u_t$) video frames. The randomly initialized CNN 218 creates one or more pseudo abnormal frames $\tilde{v}$ by applying object-aware cut mix operation on a localized object 210. The object-aware cut mix operation is represented as:

Object-aware cut mix operation=(localized object*$u_t$,$v_t$).

Conclusively, the object-aware anomaly synthesis module 216 creates the one or more pseudo abnormal frames $\tilde{v}$ and ground truth masks with the randomly initialized CNN 218. An example of the randomly initialized CNN 218 is an untrained randomly initialized ResNet-50 convolutional neural network, and other network architectures can also be used (for example, DenseNet, ResNet-101, etc.)

The one or more pseudo abnormal frames $\tilde{v}$ are sent to the normalcy classifier module 214. The normalcy classifier is further explained in FIG. 2C.

Figure 2C:
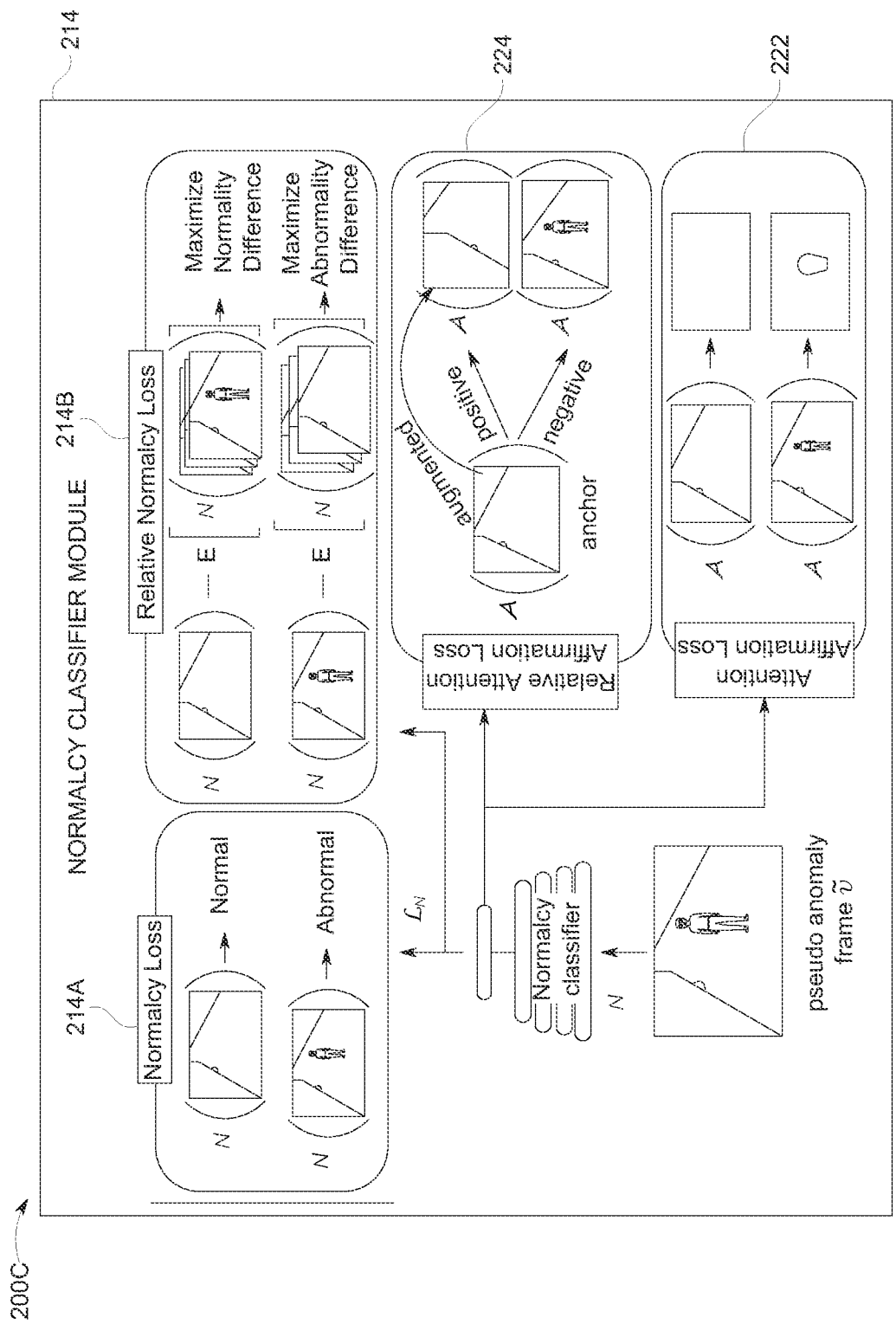
FIG. 2C illustrates a block diagram of a normalcy classifier module, according to some embodiments of the present disclosure.

FIG. 2C illustrates a block diagram 200C of the normalcy classifier module 214, according to some embodiments of the present disclosure. The normalcy classifier module 214 has a normalcy classifier N. The normalcy classifier N receives the one or more pseudo abnormal frames $\tilde{v}$ from the object-aware anomaly synthesis module 216. In addition, the normalcy classifier N receives the predicted future frame 210 $\hat{v}_{T+1}$ from the future frame prediction module 202. The normalcy classifier module 214 utilizes the one or more predicted frames $\hat{v}_{T+1}$ received from the future frame prediction module 202 and the one or more pseudo abnormal frames $\tilde{v}$ generated by the object-aware anomaly synthesis module 216 to predict probability of normalities or abnormalities in the video. The normalcy classifier module 214 is trained with the predicted normal and pseudo abnormal video frames jointly to detect anomalies in the video.

The normalcy classifier N is optimized by a plurality of loss functions. The plurality of loss functions include normalcy loss $L_N$ 214A, relative normalcy loss $L_{RN}$ 214B, attention affirmation loss 222 and relative attention affirmation loss 224. For clarity, subscript of the predicted future frame 210 $\hat{v}_{T+1}$ is marked as $\hat{v}$.

The data distribution of normal and the one or more pseudo abnormal frames $\tilde{v}$ are denoted as $\rho$ and $\kappa$, respectively. In an example, a predicted future-frame $\hat{v}$ and a pseudo-abnormal frame $\tilde{v}$ is given. In addition, the normalcy loss $L_N$ 214A optimizes the normalcy classifier N to increase the probability that $\hat{v}$ is classified as 'normal' and $\tilde{v}$ is classified as 'abnormal' using the following loss function:

$$L_N = \frac{1}{2}\mathbb{E}_{\hat{v} \sim \rho}\left[(N(\hat{v}) - 1)^2\right] + \frac{1}{2}\mathbb{E}_{\tilde{v} \sim \kappa}\left[(N(\tilde{v}))^2\right]$$

Abnormal events are viewed as deviation with respect to normal events. A key missing attribute of the above-mentioned equation is that the probability of normal event being classified as normal ($N(\hat{v})$) should increase as the probability of abnormal event being classified as normal ($N(\tilde{v})$) decreases and vice-versa. Rather than just maximizing $\mathbb{P}$ [$\hat{v}$ is normal], the normalcy classifier N maximizes $\mathbb{P}$ [$\hat{v}$ is more normal than $\tilde{v}$] ($\mathbb{P}$ [·] denotes the probability operator). This novel relative normalcy loss 214B is shown below:

$$L_{RN} = \frac{1}{2}\mathbb{E}_{\hat{v}\sim\rho}\left[(N(\hat{v}) - \mathbb{E}_{\tilde{v}\sim\kappa}[N(\tilde{v})] - 1)^2\right] + \frac{1}{2}\mathbb{E}_{\hat{v}\sim\kappa}\left[(N(\tilde{v}) - \mathbb{E}_{\hat{v}\sim\rho}[N(\hat{v})] + 1)^2\right]$$

Where $\hat{v}$ is the predicted future frame and is the pseudo-abnormal frame.

The decision of the normalcy classifier N on the normal frame $\hat{v}$ and abnormal frame $\tilde{v}$ is based on the consideration that the whole scene in $\hat{v}$ is classified as 'normal,' and the consideration that a foreign object introduced by the object-aware anomaly synthesis module 216 in $\tilde{v}$ is classified as 'abnormal'. This strategy allows obtaining exact location of the foreign object in $\tilde{v}$. Further, the object-aware anomaly synthesis module 216 creates the ground-truth masks of $\tilde{v}$ (i.e., the masks 220 with the localized object). The normalcy classifier module 214 is used to train the second neural network. The normalcy classifier module generates the plurality of loss functions that are utilized to train the second neural network. The plurality of loss functions comprises normalcy loss, relative normalcy loss, attention affirmation loss, and relative attention affirmation loss.

Furthermore, feature maps from the last convolutional layer of the normalcy classifier N are extracted to obtain attention maps $A(\hat{v})$ and $A(\tilde{v})$ for normal and abnormal frames, respectively. "A" denotes the operation to extract attention maps from the last convolutional layer of the normalcy classifier N. This constraint is enforced through an attention affirmation loss $L_{AA}$ 222 below:

$$L_{RN} = \frac{1}{2}(\mathbb{1} - A(\hat{v}))^2 + 1/2(\tilde{M} - A(\tilde{v}))^2,$$

where $\tilde{M}$ is a tensor with the value 1 at the locations of the foreign object in the mask 220 but 0 elsewhere, and $\mathbb{1}$ is a tensor of the same size as $A(\hat{v})$ with the value 1 at all the locations.

Similar to the concept of $L_{RN}$, relative attention affirmation loss $L_{RAA}$ 224 is proposed that aims to learn relative difference of attention maps from normal frames with respect to attention maps from abnormal frames. Further, the normalcy classifier N creates a first attention map pair $A(\hat{v})$ and $A(g(\hat{v}))$ and a second attention map pair $A(\hat{v})$ and $A(\tilde{v})$. The function g denotes a series of transformations (Color jitter, random affine, and random perspective) applied to $\hat{v}$. The relative difference between the attention on 'augmented normal' frame should be smaller than that of the 'pseudo-abnormal' frame with respect to the 'normal' frame. Due to this, the difference is enforced with a margin penalty m that simultaneously creates the intra-class compactness between normal and augmented-normal frames (i.e. m=0) and inter-class variance between normal and pseudo abnormal frames (i.e. m >0). $L_{RAA}$ is designed by enforcing this margin penalty as follows:

$$L_{RAA} = -\frac{1}{N}\sum_{i=1}^{N}\log\left(\frac{e^{s(\cos(\Psi_{yi}+m))}}{e^{s(\cos(\Psi_{yi}+m))} + \sum_{j=1,j\neq yi}^{2}e^{s\cos(\Psi_j)}}\right)$$

Where label $y_i$ is set as 1 for normal frame v and augmented frame $g(\hat{v})$, and 0 for pseudo-abnormal frame $\tilde{v}$. Here, $\Psi_{yi} = \|W_{yi}\|\|\text{vec}(A(x))\|\cos(\omega_{yi})$ is angle between $W_{yi} \in R^{hw \times 2}$ and $\text{vec}(A(x)) \in R^{hw}$ (with $\omega_{yi} \in [0,\pi]$). vec is a vectorizing operation.

$\|W_{yi}\|$ and $\|\text{vec}(A(x))\|$ are normalized to 1 which leads to $\psi_{yi} = \cos(\omega_{yi})$.

The training system is trained end-to-end with the generator G along with the reconstruction loss $L_G$, discriminator D along with discriminator loss $L_D$, and the normalcy classifier N along with the sum of the aforementioned four losses associated with N (denoted as $L_N$). The training system 104 performs video anomaly detection based on training of the first neural network 108 and the second neural network 110. The second neural network 110 is trained using the normalcy classifier module 214. The normalcy classifier module 214 utilizes the one or more predicted frames 210 ($\hat{v}_{T+1}$) received from the future frame prediction module 202 and the one or more pseudo abnormal frames v generated by the object-aware anomaly synthesis module 216 to predict probability of normalities or abnormalities in the video. The example one or more pseudo abnormal frames $\tilde{v}$ are shown in FIG. 3.

Figure 3:
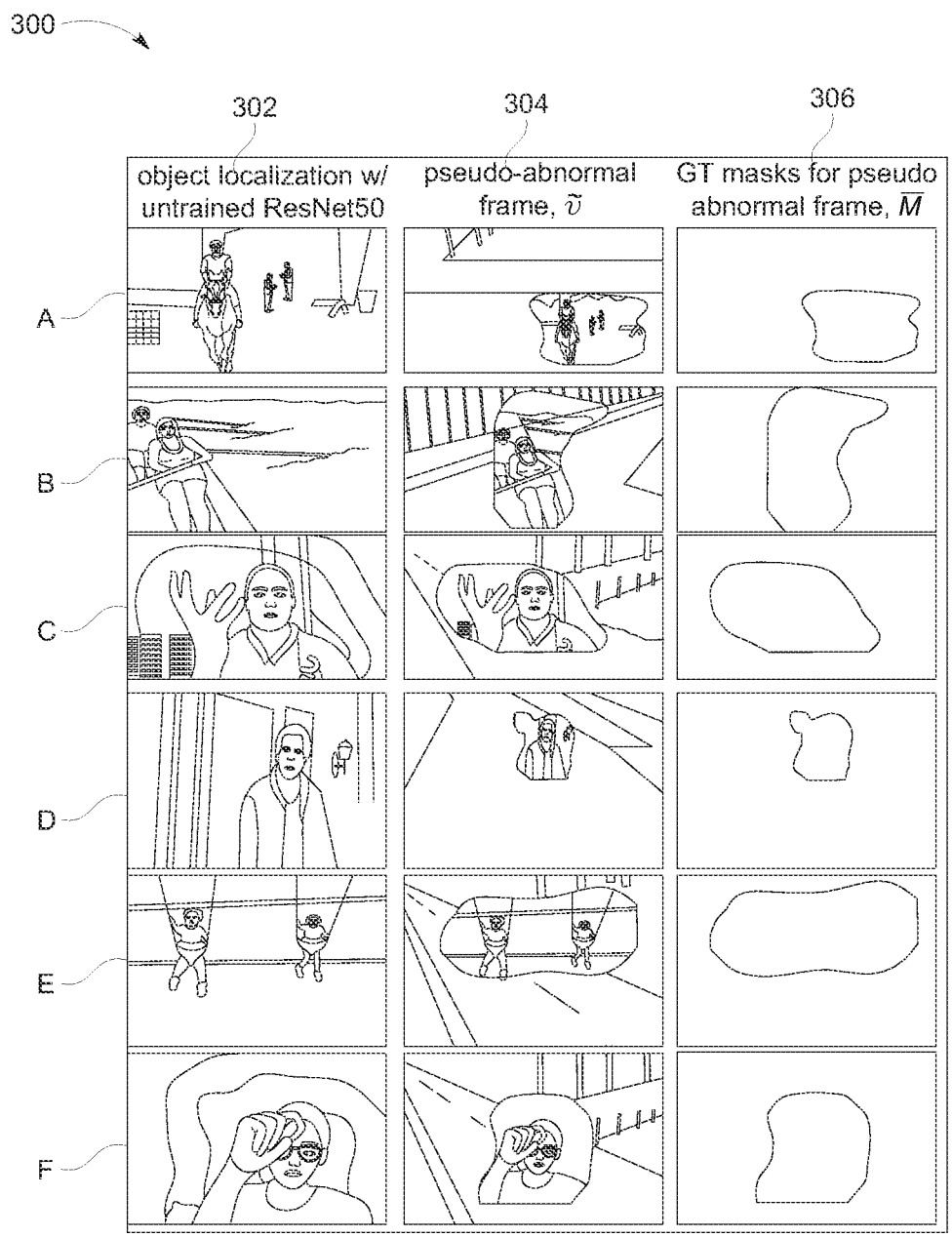
FIG. 3 shows representation of one or more pseudo abnormal frames, according to some embodiments of the present disclosure.

FIG. 3 shows representation 300 of the one or more pseudo abnormal frames $\tilde{v}$, according to some embodiments of the present disclosure. The representation 300 includes six video frames A, B, C, D, E, and F. The objects are localized from each of the video frames (A-F). At step 302, object localization is performed for every video frame (A-F) using an untrained ResNet-50 convolution neural network. At step 304, after the object localization is performed, the one or more pseudo abnormal frames $\tilde{v}$ are generated for each of the video frames A, B, C, D, E, and F. Further, at step 306, the ground truth masks for each of the video frame A, B, C, D, E, and F is generated corresponding to the relevant pseudo abnormal frames $\tilde{v}$.

Figure 4:
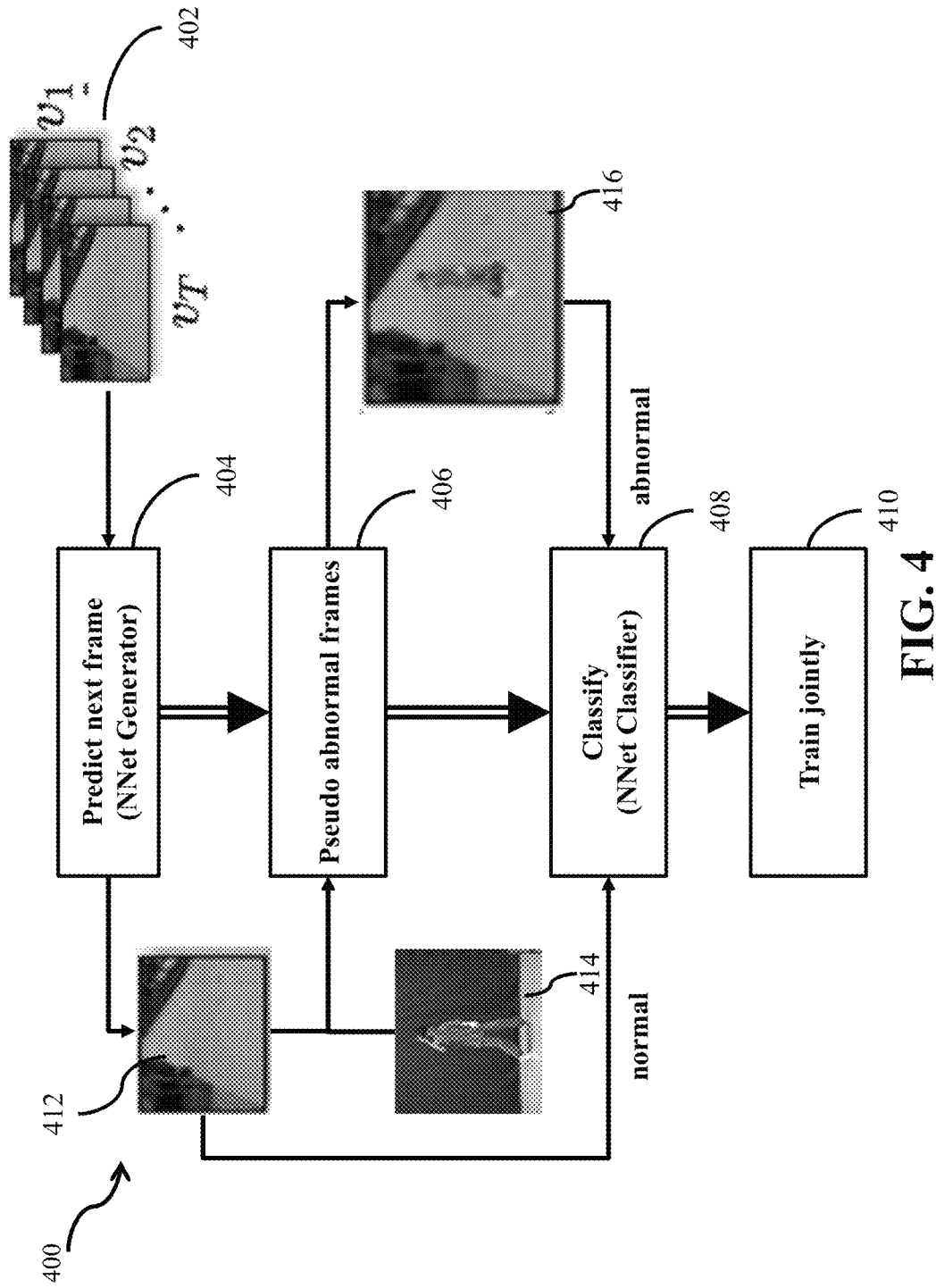
FIG. 4 shows an exemplary representation of working of the training system shown in FIG. 1, according to embodiments of the present disclosure.

FIG. 4 shows an exemplary representation 400 of working of the training system 104, according to embodiments of the present disclosure. The representation 400 utilizes components of FIGS. 2A, B and C for explaining the working of the training system 104. At step 402, one or more video frames ($v_1, v_2, \ldots v_T$) are received from a source domain. At step 404, the one or more video frames are then sent to the future prediction module 202 for prediction of a plurality of future frames 412. The plurality of future frames 412 is then sent to the normalcy classifier module 214. In addition, at step 406, pseudo abnormal frames V are generated by the object-aware anomaly synthesis module 216. The normalcy classifier module 214 utilizes the plurality of future frames 412 and the pseudo abnormal frames $\tilde{v}$ to predict probabilities of normalities or abnormalities in the one or more video frames. At step 408, the normalcy classifier module 214 classifies normal and abnormal video frames from the one or more video frames. At step 410, the normalcy classifier module 214 trains the first neural network 108 and the second neural network 110 jointly using the predicted normal and pseudo abnormal video frames jointly to detect anomalies in the video. Further, video anomaly detection is performed based on the training of the first neural network 108 and the second neural network 110.

Figure 5:
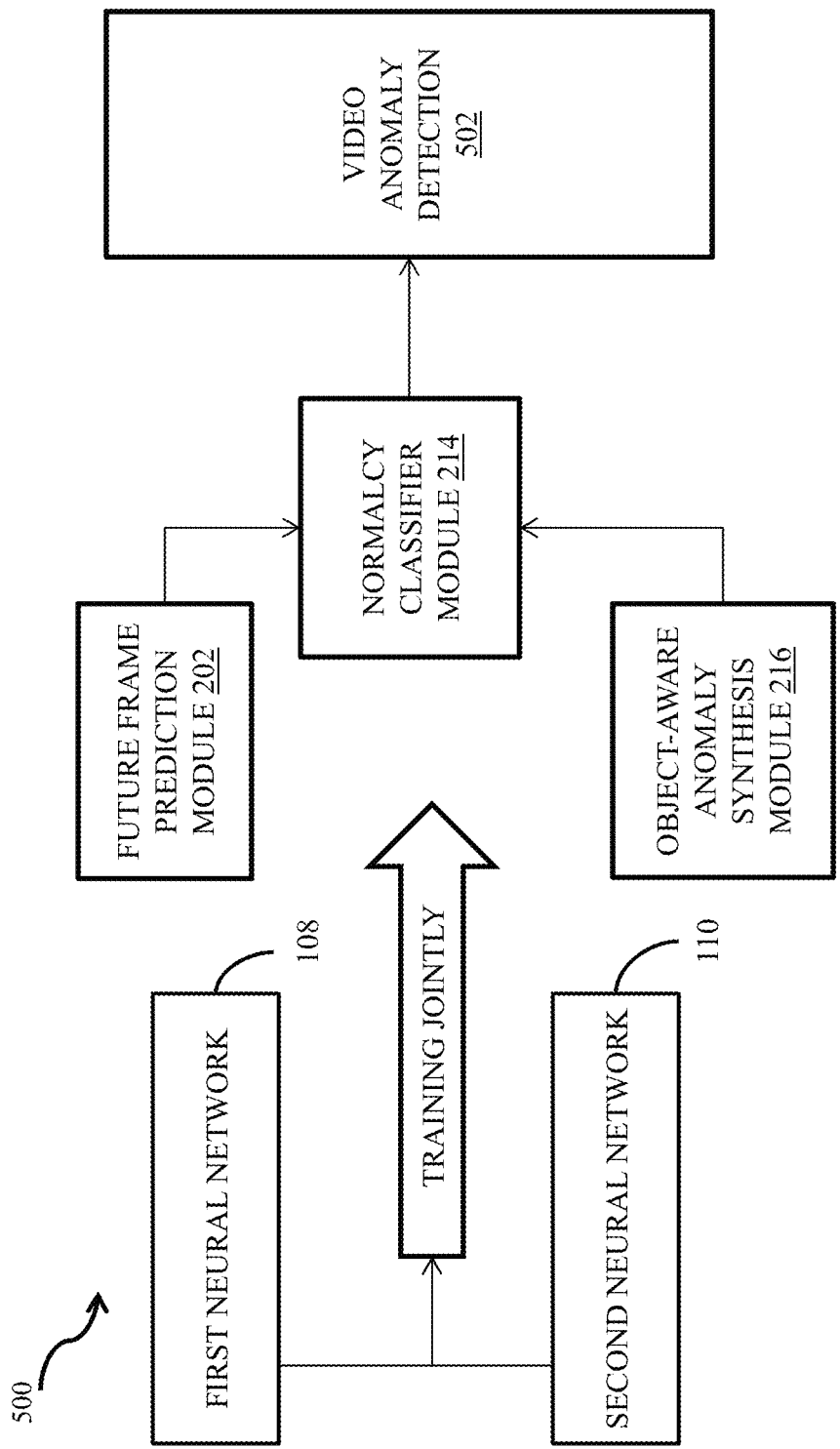
FIG. 5 shows a block diagram for jointly training the first neural network and the second neural network to perform video anomaly detection, according to some embodiments of the present disclosure.

FIG. 5 shows a block diagram 500 for jointly training the first neural network 108 and the second neural network 110 to perform video anomaly detection 502, according to some embodiments of the present disclosure. The first neural network is trained with facilitation of the future frame prediction module 202. The future frame prediction module 202 predicts the one or more predicted future frames 210 ($\hat{v}_{T+1}$). Further, the one or more future frames 210 is utilized by the normalcy classifier. Also, the normalcy classifier receives the pseudo anomaly frames $\tilde{v}$ from the object-aware anomaly synthesis module 216. The second neural network 110 is trained using the normalcy classifier module 214. The normalcy classifier module 214 utilizes the one or more predicted frames 210 ($\hat{v}_{T+1}$) received from the future frame prediction module 202 and the one or more pseudo abnormal frames $\tilde{v}$ generated by the object-aware anomaly synthesis module 216 to predict probability of normalities or abnormalities in the video. The joint training of the first neural network 108 and the second neural network 110 facilitates video anomaly detection 502.

Figure 6:
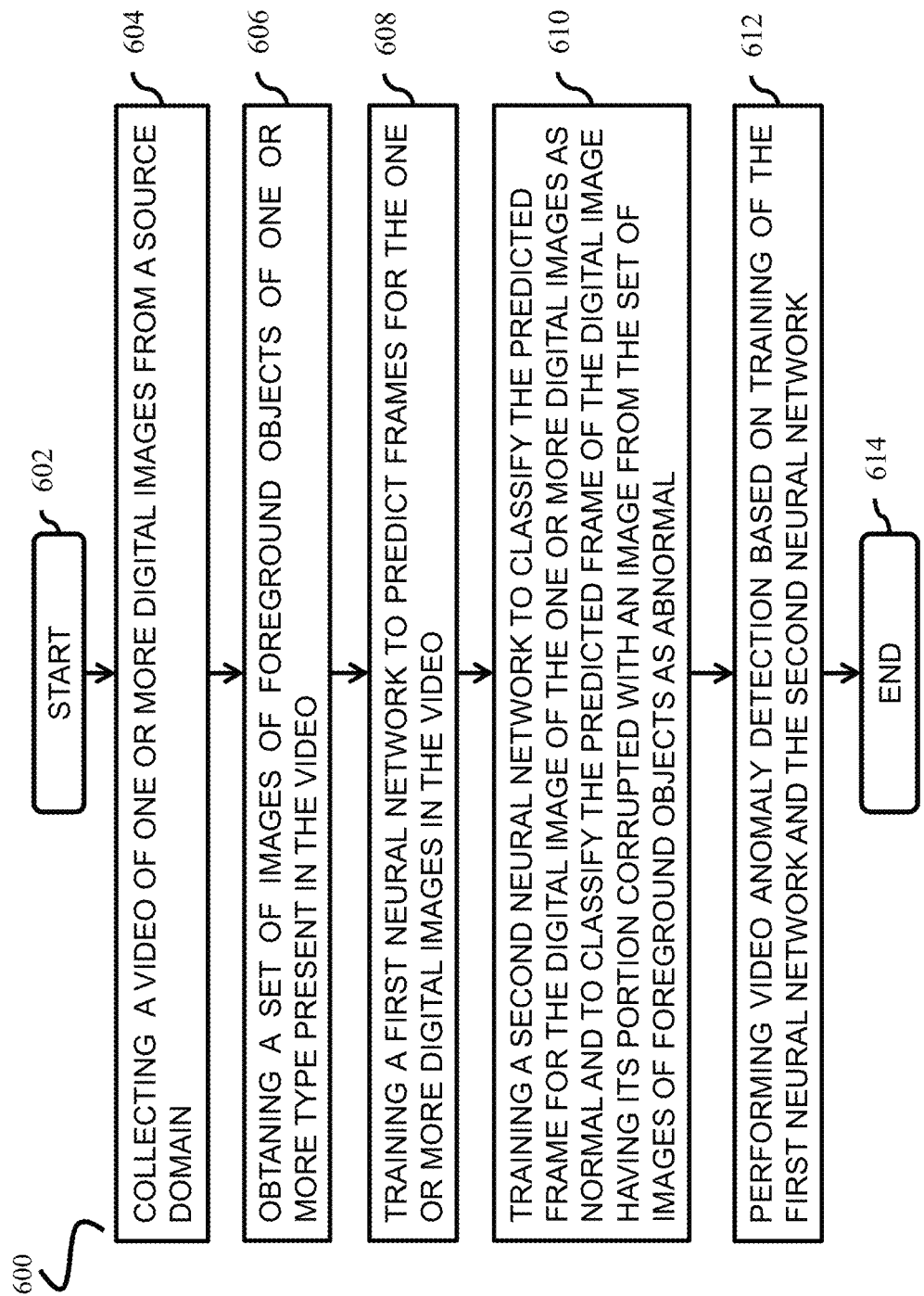
FIG. 6 shows a flow chart depicting a method for performing video anomaly detection using the training system disclosed in FIG. 4, according to various embodiments of the present disclosure.

FIG. 6 shows a flow chart depicting a method 600 for performing video anomaly detection, according to various embodiments of the present disclosure. The method 600 is performed by the training system 104. The method 600 initiates at step 602. Following step 602, at step 604, the method 600 includes collecting a video of the one or more digital images from a source domain 102. The video of the source domain 102 corresponds to at least one of task irrelevant video or a task relevant video, video related to normal events, video available publicly, and video of a plurality of images combined together.

At step 606, the method includes obtaining a set of images of foreground objects present in the video. The foreground objects correspond to at least one of a group of people, and an individual person. At step 608, the method includes training of a first neural network 108 to predict frames for the one or more digital images in the video. The first neural network 108 is trained using a future frame prediction module 202 that predicts frames for the one or more digital image. The future frame prediction module 202 comprises a generator 206 and a discriminator 212. The first neural network 108 is trained with one or a combination of a reconstruction loss and a discriminative loss. The reconstruction loss is computed to train the generator 206. The discriminative loss is computed to train the discriminator 212. The generator 206 comprises an encoder 206A, a memory module 206B, and a decoder 206C. The future frame prediction module 202 is associated with an object-aware anomaly synthesis module 216. The object-aware anomaly synthesis module 216 generates pseudo abnormal frames and learns features from normal frames relative to abnormal frames.

At step 610, the method includes training of a second neural network 110 to classify the predicted frame for the digital image of the one or more digital images as normal and to classify the predicted frame of the digital image of the one or more digital images having its portion corrupted with an image from the set of images of foreground objects as abnormal. The second neural network is trained using a normalcy classifier module 214. The normalcy classifier module 214 generates a plurality of loss functions that are utilized to train the second neural network 110. The plurality of loss functions comprises normalcy loss, relative normalcy loss, attention affirmation loss, and relative attention affirmation loss. The normalcy classifier module 214 utilizes the predicted frames received from the future frame prediction module 202 and the one or more pseudo abnormal frames generated by the object-aware anomaly synthesis module 216 to predict probability of normalities or abnormalities in the video. The normalcy classifier module 214 trains with the predicted normal and pseudo abnormal video frames jointly to detect anomalies in the video.

At step 612, the method includes performing video anomaly detection based on training of the first neural network 108 and the second neural network 110. The method terminates at step 614.

Figure 7:
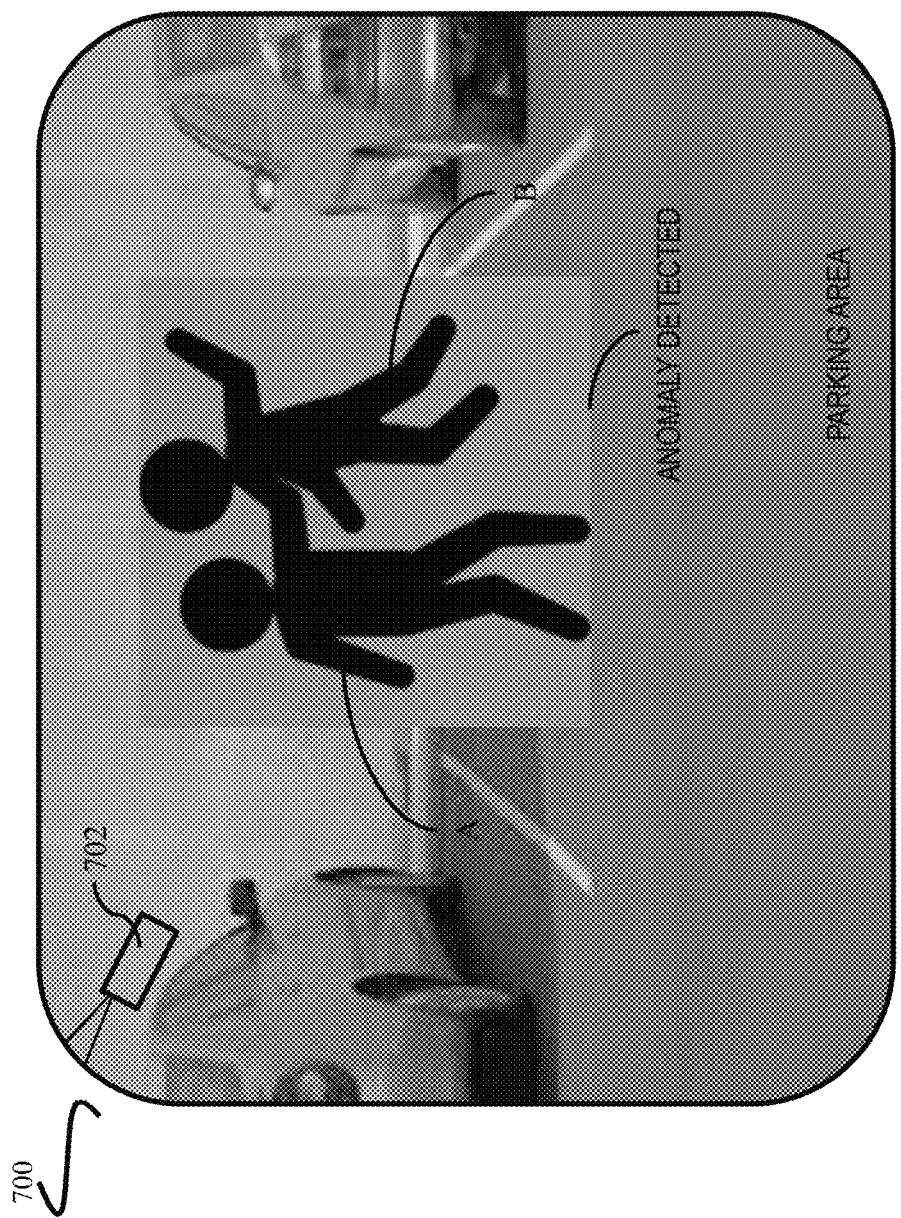
FIG. 7 shows a use case for detecting an anomaly using the training system, according to some example embodiments of the present disclosure.

FIG. 7 shows a use case for detecting an anomaly using the training system 104, according to some example embodiments of the present disclosure. The zVAD system 104 can be integrated in video surveillance system for detecting an anomaly at various places. The use case includes a scene 700 of a parking area. The scene 700 includes a video surveillance camera 702, a person A and a person B. The person A and B are found fighting with each other in the parking area scene 700. The video of the person A and the person B fighting with each other is captured in real time by the video surveillance camera 702. Further, the video is detected as an anomaly based on the trained neural networks of the training system 104. Furthermore, the training system 104 sends a video anomaly detection notification to the server and an appropriate action is taken immediately.

Many modifications and other embodiments of the inventions set forth herein will come to mind to one skilled in the art to which these inventions pertain having the benefit of the teachings presented in the foregoing descriptions and the associated drawings. It is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A computer-implemented method for performing video anomaly detection training in a video surveillance system, comprising:

obtaining, a video of one or more digital images from a source domain;

obtaining, a set of images of foreground objects present in the video;

training, a first neural network to predict one or more frames for the one or more digital images in the video, wherein the first neural network is trained using a future frame prediction module that predicts frames for the one or more digital image, where in the future frame prediction module comprises a generator and a discriminator, wherein the generator comprises an encoder, a memory module, and a decoder;

training, a second neural network to classify the predicted one or more frames as at least one of normal and abnormal, wherein the predicted one or more frames for the one or more digital images without a corruption are classified as normal, and the predicted one or more frames of the one or more digital images having its portion corrupted with an image from the set of images of foreground objects are classified as abnormal, wherein the second neural network is trained using a normalcy classifier module, wherein the normalcy classifier module is configured to generate a plurality of losses comprising: a normalcy loss, a contrastive normalcy loss, a contrastive attention affirmation loss, and an attention affirmation loss; and performing, video anomaly detection on surveillance videos based on training of the first neural network and the second neural network, wherein the video anomaly detection includes:
  detecting an anomaly in the surveillance videos; and
  sending a video anomaly detection notification to a server and to request an appropriate action to be taken.

2. The method of claim 1, wherein the foreground objects corresponds to at least one of a group of people, and an individual person.

3. The method of claim 1, wherein the first neural network is trained with one or a combination of a reconstruction loss and a discriminative loss, wherein the reconstruction loss is computed to train the generator, wherein the discriminative loss is computed to train the discriminator.

4. The method of claim 1, wherein the future frame prediction module is associated with an object-aware anomaly synthesis module, wherein the object-aware anomaly synthesis module generates pseudo anomaly frames and learns features from normal frames relative to abnormal frames.

5. The method of claim 4, wherein the object-aware anomaly synthesis module is configured to generate one or more pseudo abnormal frames and ground truth masks.

6. The method of claim 1, the normalcy classifier module utilizes the predicted frames received from the future frame prediction module and the pseudo anomaly frames generated by the object-aware anomaly synthesis module to predict probability of normalities or abnormalities in the video.

7. The method of claim 1, wherein the first neural network and the second neural network are trained jointly using predicted normal and pseudo abnormal video frames with facilitation of normalcy classifier module to detect anomalies in the video.

8. The method of claim 1, wherein the video of the source domain corresponds to at least one of: a task irrelevant, a task relevant video, a video related to normal events, a video available publicly, and video of a plurality of images combined together.

9. A training system for performing video anomaly detection training in a video surveillance system, comprising:
  at least one processor; and
  memory having instructions stored thereon that, when executed by the at least one processor, cause the training system to:
  collect a video of one or more digital images of a source domain;
  obtain a set of images of foreground objects present in the video;
  train a first neural network to predict one or more frames of one or more digital images in the video based on a sequence of the one or more digital images in the video, wherein the first neural network is trained using a future frame prediction module that predicts frames for the one or more digital image, wherein the future frame prediction module comprises a generator and a discriminator, wherein the generator comprises an encoder, a memory module, and a decoder; and
  train a second neural network to classify the predicted one or more frames as at least one of normal and abnormal, wherein the predicted one or more frames for the one or more digital images without a corruption are classified as normal, wherein the predicted one or more frames of the one or more digital images having its portion corrupted with an image from the set of images of foreground objects are classified as abnormal, wherein the second neural network is trained using a normalcy classifier module, wherein the normalcy classifier module generates a plurality of losses that are utilized to train the second neural network, wherein the plurality of losses comprises normalcy loss, relative normalcy loss, attention affirmation loss, and relative attention affirmation loss; and
  perform video anomaly detection on surveillance videos based on training of the first neural network and the second neural network, wherein the video anomaly detection includes:
    detecting an anomaly in the surveillance videos; and
    sending a video anomaly detection notification to a server and to request an appropriate action to be taken.

10. The training system of claim 9, wherein the first neural network is trained with one or a combination of a reconstruction loss and a discriminative loss, wherein the reconstruction loss is computed to train the generator, wherein the discriminative loss is computed to train the discriminator.

11. The training system of claim 9, wherein the normalcy classifier module is associated with an object-aware anomaly synthesis module, wherein the object-aware anomaly synthesis module generates pseudo anomaly frames and learns features from normal frames relative to abnormal frames.

12. The training system of claim 9, the normalcy classifier module utilizes the predicted frames received from the future frame prediction module and the pseudo anomaly frames generated by the object-aware anomaly synthesis module to predict probability of normalities or abnormalities in the video.

13. The training system of claim 9, wherein the video of the source domain corresponds to at least one of task irrelevant or relevant video, video related to normal events, video available publically, and video of a plurality of images combined together.

14. A training system for performing video anomaly detection training in a video surveillance system, comprising:
  at least one processor; and
  memory having instructions stored thereon that, when executed by the at least one processor, cause the training system to:
  collect a video of one or more digital images of a source domain; obtain a set of images of foreground objects present in the video;
  train a first neural network to predict one or more frames of one or more digital images in the video based on a sequence of the one or more digital images in the video, wherein the first neural network is trained using a future frame prediction module that predicts frames for the one or more digital image, wherein the future frame prediction module comprises a generator and a discriminator, wherein the generator comprises an encoder, a memory module, and a decoder; and train a second neural network to classify the predicted one or more frames as at least one of normal and abnormal, wherein the predicted one or more frames for the one or more digital images without a corruption are classified as normal, wherein the predicted one or more frames of the one or more digital images having its portion corrupted with an image from the set of images of foreground objects are classified as abnormal, wherein the second neural network is trained using a normalcy classifier module, wherein the normalcy classifier module is configured to generate a plurality of losses comprising: a normalcy loss, a contrastive normalcy loss, a contrastive attention affirmation loss, and an attention affirmation loss, wherein the normalcy classifier module is associated with an object-aware anomaly synthesis module, wherein the object-aware anomaly synthesis module generates pseudo anomaly frames and learns features from normal frames relative to abnormal frames; and perform video anomaly detection on surveillance videos based on training of the first neural network and the second neural network, wherein the video anomaly detection includes:

detecting an anomaly in the surveillance videos; and sending a video anomaly detection notification to a server and to request an appropriate action to be taken.

15. A computer-implemented method for performing video anomaly detection training in a video surveillance system, comprising:

obtaining a video of one or more digital images from a source domain;

obtaining, a set of images of foreground objects present in the video;

training, a first neural network to predict one or more frames for the one or more digital images in the video, wherein the first neural network is trained using a future frame prediction module that predicts frames for the one or more digital image, wherein the future frame prediction module comprises a generator and a discriminator, wherein the generator comprises an encoder, a memory module, and a decoder;

training, a second neural network to classify the predicted one or more frames as at least one of normal and abnormal, wherein the predicted one or more frames for the one or more digital images without a corruption are classified as normal, and the predicted one or more frames of the one or more digital images having its portion corrupted with an image from the set of images of foreground objects are classified as abnormal, wherein the second neural network is trained using a normalcy classifier module, wherein the normalcy classifier module generates a plurality of losses that are utilized to train the second neural network, wherein the plurality of losses comprises normalcy loss, relative normalcy loss, attention affirmation loss, and relative attention affirmation loss, wherein the normalcy classifier module utilizes the predicted frames received from the future frame prediction module and the pseudo anomaly frames generated by an object-aware anomaly synthesis module to predict probability of normalities or abnormalities in the video; and performing, video anomaly detection on surveillance videos based on training of the first neural network and the second neural network, wherein the video anomaly detection includes:

detecting an anomaly in the surveillance videos; and sending a video anomaly detection notification to a server and to request an appropriate action to be taken.

* * * * *